Figure 1:
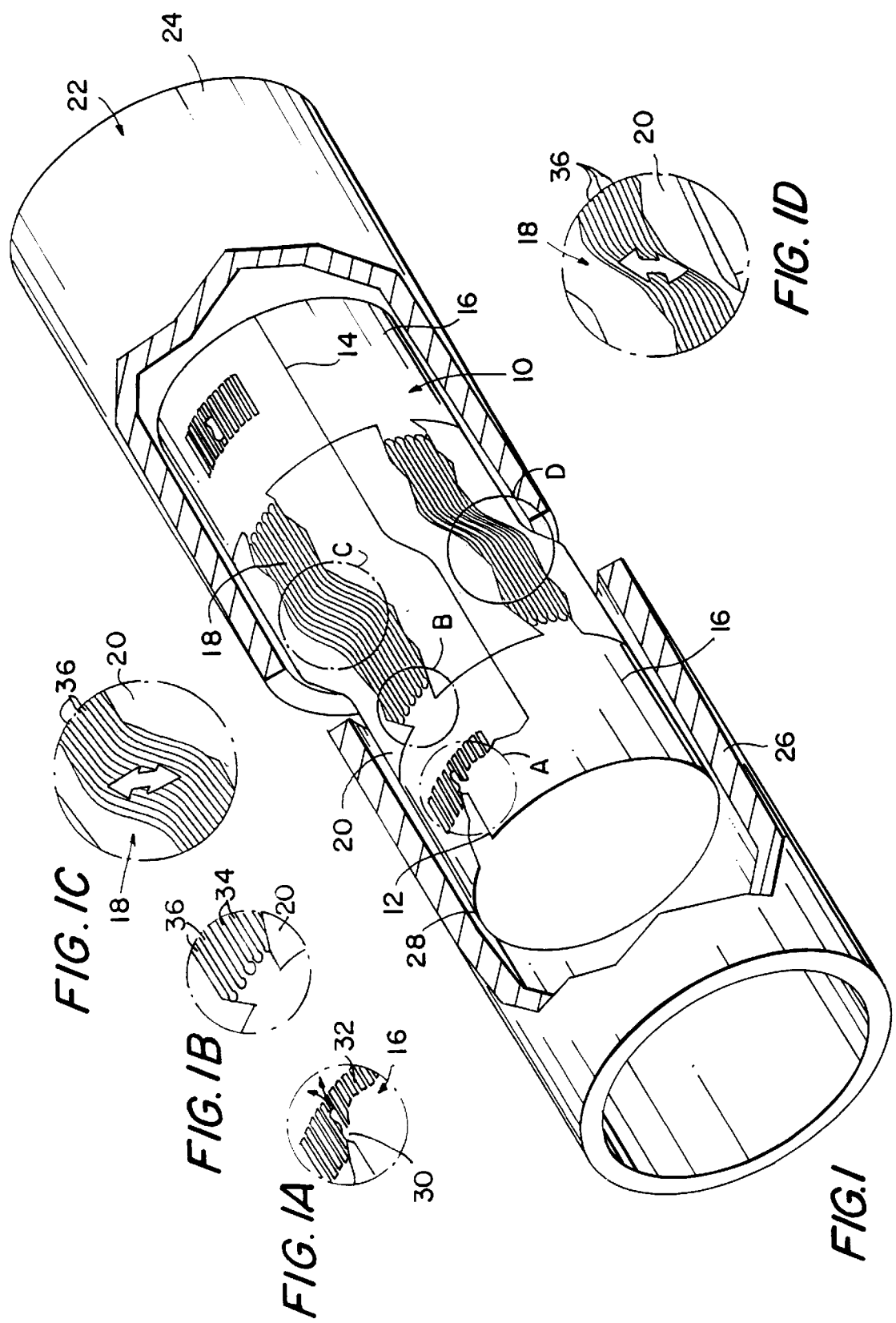

United States Patent
Brakland

[11] Patent Number: 5,868,434
[45] Date of Patent: Feb. 9, 1999

[54] SHELL FOR PIPE REPAIR

[75] Inventor: Christoph Brakland, Durach, Germany

[73] Assignee: RICO Gesellschaft für Mikroelektronik mbH, Kempten, Germany

[21] Appl. No.: 814,254

[22] Filed: Mar. 11, 1997

[30] Foreign Application Priority Data

Mar. 16, 1996 [DE] Germany ............... 196 10 477.7

[51] Int. Cl.$^6$ ............................................. F16L 55/10
[52] U.S. Cl. ....................... 285/15; 285/370; 285/424
[58] Field of Search ................................ 285/370, 397, 285/148.27, 160, 424, 15

[56] References Cited

U.S. PATENT DOCUMENTS

| Re. 20,308 | 3/1937 | McKee | 285/148.27 X |
|---|---|---|---|
| 1,829,236 | 10/1931 | Perkins | 285/370 X |
| 1,977,175 | 10/1934 | Davis | 285/397 X |
| 1,983,989 | 12/1934 | Pallas | 285/397 |
| 2,179,193 | 11/1939 | Parrish | 285/424 X |
| 3,680,896 | 8/1972 | Cupit | 284/148.27 X |
| 3,700,265 | 10/1972 | Dufour | 285/370 X |
| 4,647,072 | 3/1987 | Westman | 285/370 X |
| 4,865,357 | 9/1989 | Brinegar | 285/424 X |
| 5,465,758 | 11/1995 | Graf et al. | 285/397 X |

FOREIGN PATENT DOCUMENTS

| 268792 | 2/1969 | Austria | 285/424 |
|---|---|---|---|
| 1291667 | 2/1987 | U.S.S.R. | 285/370 |

*Primary Examiner*—Dave W. Arola
*Attorney, Agent, or Firm*—Notaro & Michalos P.C.

[57] ABSTRACT

A tubular metal shell (10) with mutually overlapping ends serving to line the insides of damaged sewer pipes (22) possesses an intermediate portion (18) located between two end portions (16), the intermediate portion (18) having, as a result of a plurality of axial slots, a lower resistance to distortion than the end portions (16). When such a shell (10) is installed in a sewer pipe with offset connecting sleeves in such a way that the intermediate portion (18) of the shell (10) where the material has been weakened reaches the region of radial offset, the intermediate portion (18) can distort, thus forming a transition between the two radially offset sections of pipe (24, 26). At least the intermediate portion (18) is sealed all round with an elastic sealant or a hose. The repair shell (10) is particularly suitable for repairing sewer pipes with offset connecting sleeves.

10 Claims, 3 Drawing Sheets

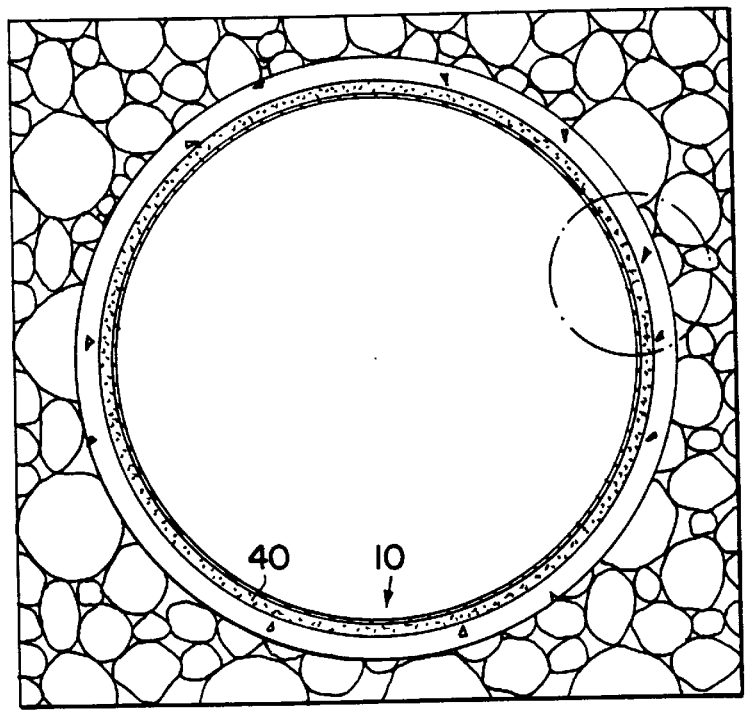
FIG. 9
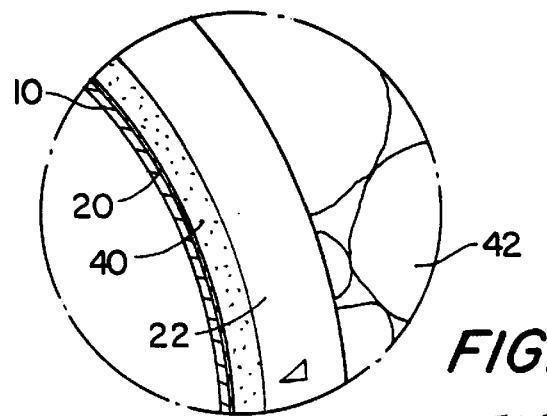
FIG. 10
FIG. 11
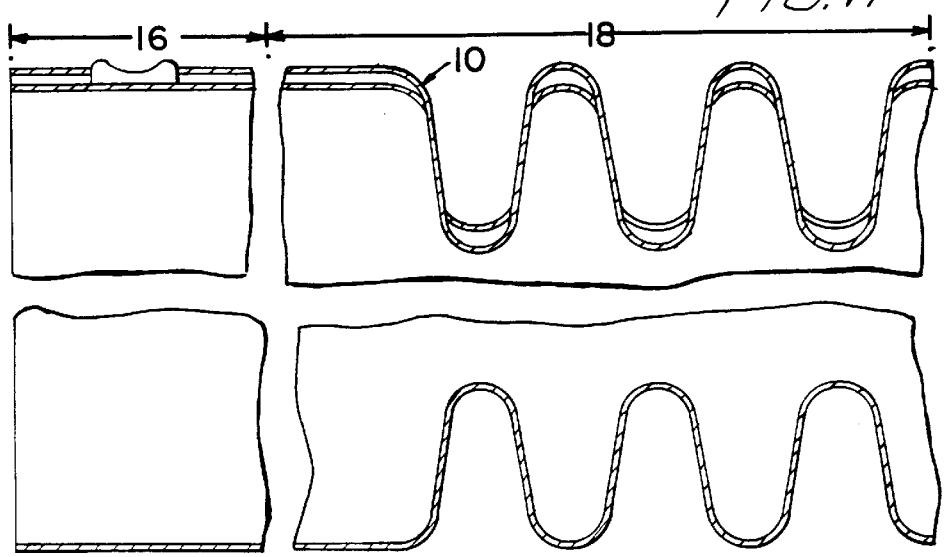

SHELL FOR PIPE REPAIR

FIELD AND BACKGROUND OF THE INVENTION

The invention relates to an expandable shell, especially one made of sheet metal, with mutually overlapping longitudinal edges for repairing the insides of sewer pipes, the shell comprising two end portions and one intermediate portion combining said end portions into a single continuous element, with, allocated to each one of said end portions, an interlocking closure permitting the diameter of the shell to be enlarged but forming a positive locking engagement in the opposite direction, said interlocking closure having a slot and ridge arrangement beginning adjacent to one longitudinal edge and extending in a circumferential direction with slots and/or ridges parallel to the axis.

A shell of this kind is known from the PCT application WO 95/15460. Similar prior art can be found in the German utility models DE-U-8707049 and 9313379 and in the European patent application EP-A-0101258. Shells of this kind have a sealing means and/or an adhesive applied to their outer sides after a packer has been inserted into them. A traction cable is used to haul the packer, together with the shell surrounding it, into position in the sewer pipe, where the packer is inflated by means of an entrained pneumatic hose, so that the shell expands in the process and remains pressed against the section of pipe to be repaired. The interlocking closure ensures that the shell remains in position even after the packer has been withdrawn.

Shells of the known type can be used successfully in straight sewer pipes in order, for example, to seal cracks in the wall. In practice, however, damage to sewer pipes often occurs where two neighbouring sections of pipe are radially offset. In many cases, the offset is bridged by a connecting sleeve. Damage of this kind cannot be repaired with the known repair shells, because, when in an interlocked position supported from the outside, the shells exhibit a high resistance to distortion similar to that of a circumferentially closed pipe, so that they cannot be bent. The shells would remain in an angular position in the two sections of sewer pipe to be joined; they would be unable to expand to the internal diameter of the sections of sewer pipe and would only be in contact with the sewer pipes at certain points.

SUMMARY OF THE INVENTION

The object of the present invention is to design the known shell in such a way that it can also be used in offset sections of pipe and in places where the offset is bridged by a connecting sleeve, in order to seal damaged sections of this kind.

This problem is solved by using a shell of the kind described at the beginning in such a way that the intermediate portion of the shell offers less distortion resistance to being bent about its longitudinal axis than the end portions of the shell. For the purposes of the invention, therefore, the shell is subdivided into three portions, the intermediate portion located between the two end portions exhibiting less resistance to distortion than the end portions. The reduction in the resistance to distortion can be achieved by weakening the material and/or by providing a folding bellows arrangement. The material can be weakened either by abrading material or by punching a pattern of apertures. It thus falls within the scope of the invention to design the shell with thinner walls in the intermediate portion than in the end portions, for example by welding, bonding or riveting it to the thicker end portions. The shell can, however, be manufactured from an integral blank made of sheet metal, in which the thickness of the material is reduced by laser or electro-erosion or by chemical or electrochemical treatment. The material does not necessarily need to be weakened to a uniform extent about the entire circumference of the shell, because the resistance of a shell to bending is considerably greater in the plane at right angles to the point where an offset is bridged by a connecting sleeve than in the plane of axial displacement. It thus lies within the scope of the invention to provide the intermediate portion of the shell with at least two weakened zones which are at least approximately diametrically opposed to one another. When the shell has been installed, these weakened zones would extend on both sides of the plane at right angles to the radial offset of the pipes. The greatest material weakening ought to lie in this plane and can be gradually reduced in both directions along the circumference.

According to one embodiment of the invention, the intermediate portion of the shell possesses a pattern of apertures extending all round, in such a way that the intermediate portion is formed like a grid or sieve. Thanks to the remaining bridges of the grid in the intermediate portion, the latter is easily deformable and adapts to the shape of the connecting sleeve when the shell is installed, so that the two end portions of the shell are in each case located coaxially in the two sections of sewer pipe. When the shell is installed, the intermediate portion of the shell with the weakened material is distorted into a steady transition between the two cylindrical end portions. This shape, which results when the shell is installed, is enhanced if the resistance to distortion of the intermediate portion is lowest in its central region and increases towards the end portions, i.e. in an axial direction.

If the intermediate portion of the shell is designed with a folding bellows arrangement, it is possible to stretch the intermediate portion along one surface line and to compress it on the diametrically opposite surface line, and thus to bend the intermediate portion. The casing of the intermediate portion is then corrugated in cross-section and it will be readily appreciated that the amplitudes are small in relation to the diameter of the shell. The size of the amplitude will be no more than 5% of the diameter of the shell.

One way of creating a folding bellows arrangement for the intermediate portion is to provide the intermediate portion with closely spaced circumferential grooves on the inside and/or outside. If there is a groove arrangement on both sides, the grooves on one side will be staggered in relation to those on the opposite side. These grooves can be created by abrading material, whereby a considerable reduction in the resistance to distortion is achieved. They can, however, also be created by stamping while the shell is being rounded, without any weakening of the material occurring. In the latter case, the reduction in the resistance of the intermediate portion to distortion is due entirely or at least very substantially to the special shape of the casing, which, in the intermediate portion, is corrugated in axial cross-section.

While apertures in the intermediate portion of the shell would run counter to the sealing objective, the sealing effect in the shell of the invention is achieved by the elastic single-component polyurethane sealants applied to the outside of the shell. This forms a closed elastic envelope surrounding the shell. The dimensions of the apertures created in the intermediate portion in order to weaken the material are adapted to the viscosity of the sealant in such a way that the latter can fill out the apertures but will not drip into the interior of the shell when the sealant is being applied. Instead of applying a layer of elastic sealant, it is also possible—as is actually known—to use a hose of elastic material.

The invention further relates to a method of manufacturing a repair shell for repairing sewer pipes, said method consisting of the following steps: an approximately rectangular blank made of sheet metal has an intermediate portion located between two end portions; a pattern of apertures is created in said intermediate portion while engagement slots are punched into said end portions at the same time; said blank is rounded into a shell and one longitudinal edge of the shell is engaged, in the region of the end portions of said shell, in engagement slots adjacent to the other longitudinal edge when the shell is small in diameter for insertion purposes; at least in the intermediate portion, the shell is coated all round with an elastic sealant which fills out the apertures in the intermediate portion of the shell. After said sealant has cured, it thus forms an elastic outer skin having knobs on the inside which penetrate the apertures in the shell made of sheet metal. The elastic sealing skin is thus held firmly in place on the shell made of sheet metal, in positive locking engagement.

BRIEF DESCRIPTION OF THE INVENTION

This will now be explained in more detail with reference to the drawing, which represents embodiments of the invention.

In the drawings,

FIG. 1 is a three-dimensional view of a repair shell inserted into a sewer pipe with an offset connecting sleeve, FIG. 1A is an enlargement of section A in FIG. 1, FIG. 1B is an enlargement of section B in FIG. 1, FIG. 1C is an enlargement of section C in FIG. 1, FIG. 1D is an enlargement of section D in FIG. 1, FIG. 2 to FIG. 8 show different types of patterns of apertures which can be used with the shell in accordance with FIG. 1, FIG. 9 is a radial cross-section through a sewer pipe with a repair shell installed, FIG. 10 is an enlarged section of the region circled in FIG. 9, and FIG. 11 is a longitudinal section through one part of a modified shell.

FIG. 1 shows a shell 10 made of rust-proof sheet steel having an inner longitudinal edge 12 and an outer longitudinal edge 14. The shell 10 has two end portions 16 and an intermediate portion 18 between them, combined integrally. The latter is surrounded by a layer 20 of single-component polyurethane sealant, which is shown partially removed in FIG. 1 in order to reveal the arrangement of the shell beneath it. The shell 10 is shown inside a sewer pipe 22, with the two sections of pipe 24, 26 being radially offset. An annular gap 28 is formed between the shell 10 and the two sections of sewer pipe 24, 26, which is filled, when the system is used in practice, with a two-component adhesive on an epoxy resin basis.

In the two end portions 16 of the shell 10, a projecting tongue 30 is formed on each inner longitudinal edge 12, said tongue 30 engaging in a slot, parallel to the axis, of a slot arrangement 32 located in the casing section of the shell 10 adjacent to the other longitudinal edge 14. Said edge tongue 30 and said slot arrangement 32 each constitute an interlocking closure. The intermediate portion 18 of the shell 10 is delimited by a plurality of axial slots 34. This arrangement of straight axial slots extends around the entire circumference of the shell, including the overlapping portion. Remaining between said slots 34 are narrow bridges of the wall 36, which join together the two end portions 16 of the shell.

After the shell 10 has been expanded by the inflated packer (not shown), the intermediate portion 18 of the shell 10 is distorted in accordance with the pipe offset. In the direction of the pipe offset (FIG. 1C), the wall bridges 36 are distorted into an approximately "S" shape, in the longitudinal direction of the shell. In a plane at right angles to the pipe offset, there is a combined distortion of the bridges 36, thus causing an additional distortion in the transverse direction of the shell (FIG. 1D).

In the embodiment shown, the polyurethane sealant 20 forms an envelope which is slightly longer than the length of the intermediate portion 18, so that the slots 34 are completely filled with the elastic sealant.

Figure 2:
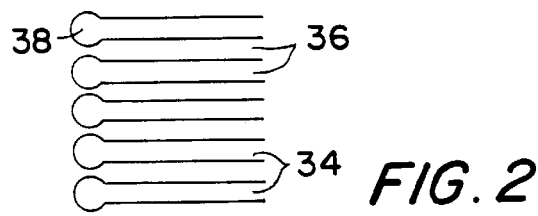
Figure 3:
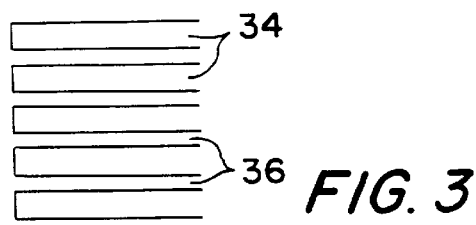

As can be seen from FIG. 2, the slots 34 widen at their ends into a circular shape. Between the wider end parts 38, the bridges 36 are narrowest and are at their greatest mutual circumferential spacing, so that distortion occurs most easily here. In accordance with FIG. 3, the slots 34 are of a constant width.

Since it is desirable that the resistance to distortion of the intermediate portion 18 should be lowest towards the middle of the length of the slots, it is expressly also within the scope of the present invention to make the slots 34 wider in the central section of the intermediate portion 18 and to cause them to taper towards the ends of the slots in each case, as a result of which the bridges 36 formed between the slots are complementary in shape, which means that they can distort most easily in the central section of the intermediate portion 18. In practical use, this central section is in the position of the pipe offset.

Figure 4:
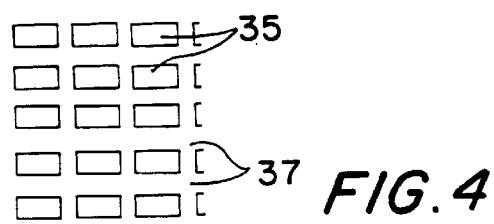
Figure 5:
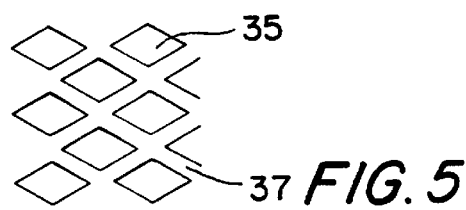
Figure 6:
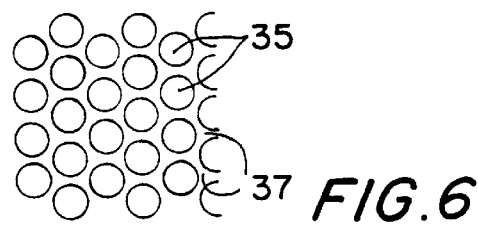
Figure 7:
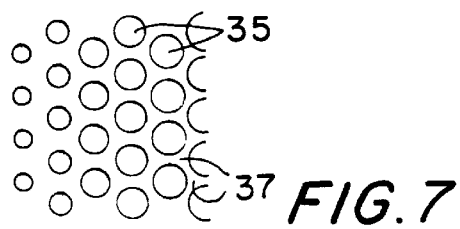
Figure 8:
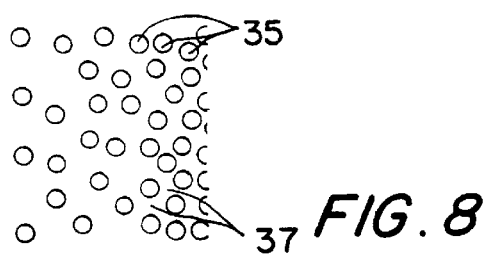

In FIG. 4, the intermediate portion 18 has a regular pattern of rectangular apertures in the shell 10, so that the bridges 37 formed between the apertures 35 cross each other at right angles to form a grid pattern. The bridges 37 run parallel to the axis and in a circumferential direction. In FIG. 5, the apertures 35 are lozenge-shaped, with the remaining bridges 37 extending on both sides at angles of 30° to surface lines parallel to the axis. FIG. 6 shows a pattern of circular apertures 35 punched out, with correspondingly complementary bridges 37 forming a sieve-like structure. FIG. 7 illustrates a section of the intermediate portion 18 in which the apertures 35 become gradually smaller towards the end portions 16 of the shell 10, with a concomitant gradual widening of the bridges 37, with the result that the resistance of the intermediate portion 18 to distortion is lowest in its central section and gradually increases towards the end portions 16. Finally, FIG. 8 shows a pattern of apertures in which apertures of the same size are used, but they are arranged in a random pattern, e.g. according to Floyd-Steinberg diffusion, and in addition the spacing between the apertures 35 increases in the direction of the end portions 16 of the shell 10, so that the resistance to distortion gradually increases from the middle of the intermediate portion 18 towards the end portions 16.

FIGS. 9 and 10 show the shell 10 when installed, with sealant 20 applied and with a layer of two-component adhesive 40 on an epoxy resin basis applied to said sealant 20 inside the sewer pipe 22, which is embedded in the ground 42.

FIG. 11 shows a shell 10 which is cylindrical in the region of its end portions 16 and is shaped like folding bellows in the region of the intermediate portion 18. This folding bellows is formed by convex peaks and concave troughs, the radial distance between peaks and troughs amounting to no more than 5% of the diameter of the shell. In the case of a shell made of sheet metal, the folding bellows arrangement can be created by stamping. It is, however, also within the scope of the present invention for the shell 10 to consist of a number of parts, so that, for example, the two end portions 16 are bent out of sheet metal, while the more easily distortable intermediate portion 18 with the folding bellows arrangement is made of plastic which is bonded to the two end portions 16.

I claim:

1. An expandable shell for repairing insides of sewer pipes, the shell comprising a tubular member having overlapping longitudinal edges, the member having two end portions and one intermediate portion combining said end portions into a single continuous member, with, allocated to each one of said end portions, an interlocking closure permitting the diameter of the shell to be enlarged but forming a positive locking engagement in an opposite diameter reducing direction, said interlocking closure having a slot and tongue arrangement beginning adjacent one longitudinal edge and extending in a circumferential direction with a tongue of one longitudinal edge engaging a slot of the other longitudinal edge of the shell, the intermediate portion of the shell having distortion means for offering less distortion resistance to being bent about its longitudinal axis than the end portions of the shell, and sealing means engaged around the shell for sealing an outer surface of the shell against an inner surface of the sewer pipes.

2. A shell as claimed in claim 1, wherein the distortion means comprises the resistance to distortion of the intermediate portion is lowest in its central section and increases towards the end portions.

3. A shell as claimed in claim 1, wherein the distortion means comprises the intermediate portion of the shell has at least two zones of weakened material which are approximately diametrically opposed to one another.

4. A shell as claimed in claim 3, wherein the zones of weakened material are apertures and said sealing means sealing said apertures.

5. A shell as claimed in claim 4, wherein the pattern of apertures consists of slots parallel to the axis.

6. A shell as claimed in claim 5, wherein the ends of the slots are broadened circumferentially.

7. A shell as claimed in claim 1, wherein the distortion means comprises the intermediate portion of the shell possesses a pattern of apertures extending all round, with its apertures forming a grid-like pattern and said sealing means sealing said apertures.

8. A shell as claimed in claim 1, wherein the distortion means comprises the thickness of the material in the intermediate portion of the shell is less, at least in some regions, than that of the end portions.

9. A shell as claimed in claim 8, wherein the intermediate portion possesses, at least on one side, a plurality of closely spaced circumferential grooves.

10. A shell as claimed in claim 1, wherein the distortion means comprises the intermediate portion of the shell is designed with a folding bellows arrangement.

* * * * *